United States Patent
Komada et al.

(10) Patent No.: US 10,029,674 B2
(45) Date of Patent: Jul. 24, 2018

(54) CONTROL DEVICE FOR HYBRID VEHICLE AND HYBRID VEHICLE

(71) Applicant: TOYOTA JIDOSHA KABUSHIKI KAISHA, Toyota-shi, Aichi-ken (JP)

(72) Inventors: Hideaki Komada, Gotemba (JP); Hiroyuki Shibata, Odawara (JP); Yuki Kurosaki, Susono (JP); Hiroyuki Shioiri, Yokohama (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 38 days.

(21) Appl. No.: 15/112,247

(22) PCT Filed: Jan. 20, 2015

(86) PCT No.: PCT/IB2015/000047
§ 371 (c)(1),
(2) Date: Jul. 18, 2016

(87) PCT Pub. No.: WO2015/110896
PCT Pub. Date: Jul. 30, 2015

(65) Prior Publication Data
US 2016/0339908 A1 Nov. 24, 2016

(30) Foreign Application Priority Data
Jan. 24, 2014 (JP) ................. 2014-011302

(51) Int. Cl.
*B60K 6/26* (2007.10)
*B60K 6/383* (2007.10)
(Continued)

(52) U.S. Cl.
CPC ............... *B60W 20/40* (2013.01); *B60K 6/26* (2013.01); *B60K 6/383* (2013.01); *B60K 6/387* (2013.01);
(Continued)

(58) Field of Classification Search
CPC .......... B60K 6/26; B60K 6/383; B60K 6/387; B60K 6/445; B60K 2006/381;
(Continued)

(56) References Cited

U.S. PATENT DOCUMENTS 5,788,006 A 8/1998 Yamaguchi
2002/0112901 A1* 8/2002 Yamaguchi ............ B60K 6/365
180/65.235
(Continued)

FOREIGN PATENT DOCUMENTS

DE 102007022129 A1 11/2008
JP 08-295140 A 11/1996
(Continued)

*Primary Examiner* — Khoi H Tran
*Assistant Examiner* — Robert T Nguyen
(74) *Attorney, Agent, or Firm* — Sughrue Mion, PLLC

(57) ABSTRACT

A hybrid vehicle includes: an engine; a first motor; an output member; a differential mechanism, the engine, the first motor, and the output member being coupled via the differential mechanism; a second motor configured to apply torque to the output member; and an engagement mechanism configured to stop rotation of an output shaft of the engine or rotation of a specified rotational member that is coupled to the output shaft of the engine. An electronic control unit is configured to (i) engage the engagement mechanism when the hybrid vehicle travels reversely by drive power of the second motor or drive power of the first motor and the second motor, and (ii) disengage the engagement mechanism when the hybrid vehicle travels forward by the drive power of the second motor or the drive power of the first motor and the second motor.

9 Claims, 8 Drawing Sheets

(51) Int. Cl.
*B60K 6/445* (2007.10)
*B60W 10/02* (2006.01)
*B60W 10/08* (2006.01)
*B60W 20/40* (2016.01)
*B60K 6/387* (2007.10)
*B60W 20/00* (2016.01)
*B60W 30/18* (2012.01)
*B60W 30/184* (2012.01)
*B60K 6/38* (2007.10)

(52) U.S. Cl.
CPC .............. *B60K 6/445* (2013.01); *B60W 10/02* (2013.01); *B60W 10/08* (2013.01); *B60W 20/00* (2013.01); *B60W 30/18036* (2013.01); *B60K 2006/381* (2013.01); *B60W 30/1846* (2013.01); *B60W 2510/244* (2013.01); *B60W 2520/10* (2013.01); *B60W 2550/148* (2013.01); *B60W 2710/027* (2013.01); *B60W 2710/08* (2013.01); *B60W 2720/24* (2013.01); *B60Y 2200/92* (2013.01); *B60Y 2300/18033* (2013.01); *Y02T 10/6239* (2013.01); *Y02T 10/7258* (2013.01); *Y10S 903/906* (2013.01); *Y10S 903/913* (2013.01)

(58) Field of Classification Search
CPC ...... B60W 10/02; B60W 10/08; B60W 20/00; B60W 20/40; B60W 30/1846; B60W 30/18036; B60W 2510/244; B60W 2520/10; B60W 2550/148; B60W 2710/0247; B60W 2710/08; B60W 2720/24; B60Y 2200/92; B60Y 2300/18033; Y02T 10/6239; Y02T 10/7258; Y10S 903/906; Y10S 903/913
See application file for complete search history.

(56) References Cited

U.S. PATENT DOCUMENTS

| | | | |
|---|---|---|---|
| 2005/0082096 A1 | 4/2005 | Oono | |
| 2012/0142472 A1 | 6/2012 | Samie et al. | |
| 2013/0109523 A1 | 5/2013 | Shibata et al. | |
| 2013/0304295 A1* | 11/2013 | Tagawa | B60K 6/445 701/22 |
| 2014/0114514 A1* | 4/2014 | Crombez | B60W 10/06 701/22 |
| 2015/0292600 A1* | 10/2015 | Al | B60K 6/365 475/5 |
| 2016/0297291 A1* | 10/2016 | Yamada | B60K 28/14 |

FOREIGN PATENT DOCUMENTS

| | | |
|---|---|---|
| JP | 2004-306951 A | 11/2004 |
| JP | 2013-141959 A | 7/2013 |
| WO | 2008/138538 A1 | 11/2008 |
| WO | 2013/051158 A1 | 4/2013 |

* cited by examiner

CONTROL DEVICE FOR HYBRID VEHICLE AND HYBRID VEHICLE

BACKGROUND OF THE INVENTION

1. Field of the Invention

The present invention relates to a device that controls a hybrid vehicle including an engine and a motor as drive power sources and a hybrid vehicle. The present invention particularly relates to a control device for a hybrid vehicle that is configured such that an engine and a first motor having a power generation function are coupled to a power split mechanism having a differential function and that power generated by the first motor is supplied to a second motor that generates drive power for traveling and to a hybrid vehicle.

2. Description of Related Art

Examples of a hybrid vehicle of this type are described in Japanese Patent Application Publication No. 8-295140 (JP 8-295140 A) and Japanese Patent Application Publication No. 2013-141959 (JP 2013-141959 A). A configuration of such a hybrid vehicle will be described briefly. A planetary gear mechanism of single pinion type is provided as a power split mechanism, an engine is coupled to a carrier thereof, and a first motor generator is coupled to a sun gear thereof. A ring gear serves as an output element and is coupled to a differential via a specified gear train. Then, a second motor generator is coupled to an output shaft thereof, and power that is generated in the first motor generator is supplied to this second motor generator.

In addition, a one-way clutch is provided that is engaged to inhibit reverse rotation (negative rotation) of the engine, the carrier that is coupled thereto, or an engine shaft that connects the engine and the carrier. This one-way clutch inhibits the rotation of the engine, the carrier, or the engine shaft by receiving a reactive force that is generated in conjunction with negative rotation of the first motor generator. As a result, output torque of the first motor generator is transmitted as torque in a positive rotational direction to the ring gear. In other words, it is configured that so-called two-motor EV travel is performed in which the first and second motor generators function as traveling motors during a forward travel. Noted that JP 8-295140 A describes an example in which a brake is provided instead of the one-way clutch.

SUMMARY OF THE INVENTION

As described above, when the so-called two-motor EV travel can be performed by functioning the first and second motor generators as the traveling motors, drive torque during a travel as an electric vehicle (an EV travel) can be increased. Meanwhile, a drive device that is described in each of the above-described Patent Documents is configured such that the second motor generator functions as the motor for a reverse travel. If the first motor generator functions as the traveling motor in order to increase the drive torque during a reverse travel, the first motor generator rotates forward. In this case, in conjunction with the forward rotation, torque in a forward rotational direction acts on the carrier. Since the above-described one-way clutch is configured to inhibit the rotation in the negative rotational direction of the engine, the carrier, or the engine shaft, the one-way clutch cannot inhibit the forward rotation of the engine, carrier, or the engine shaft or cannot apply the reactive force thereto. Therefore, in the above configuration, so-called reverse travel by the two motors cannot be performed.

Noted that, in the configuration described in JP 8-295140 A that uses the brake instead of the one-way clutch, the brake stops the rotation of the engine in a so-called low vehicle speed and high torque state in which a vehicle speed is 30 km/h or lower and an accelerator pedal opening degree is 80% or higher. In this case, the output of the second motor generator is simultaneously set to the maximum. In other words, it is configured that the brake is engaged during the so-called forward travel by the one motor, and it is not configured that the two motor generators function as the drive power source during the reverse travel. Furthermore, when there is large input (so-called reverse input) from the output shaft side due to a road condition, an operation by a driver, or the like during the forward travel with the second motor generator at the maximum output, the reverse output acts on the brake due to the engagement of the brake. This can cause degraded durability of the brake.

An object of the present invention is to increase driving torque during a reverse travel while avoiding or inhibiting excessive torque from acting on an engagement mechanism or a member whose rotation is stopped by the engagement mechanism, the engagement mechanism stopping rotation of an engine, a rotational member that is coupled to the engine, or an engine shaft during the forward travel of the vehicle in a hybrid vehicle that can travel by a motor.

A first aspect of the present invention is a control device for a hybrid vehicle. The hybrid vehicle includes: an engine; a first motor; an output member; a differential mechanism, the engine, the first motor, and the output member being coupled via the differential mechanism; a second motor configured to apply torque to the output member; and an engagement mechanism configured to stop rotation of an output shaft of the engine or a specified rotational member that is coupled to the output shaft of the engine. The control device includes an electronic control unit. The electronic control unit is configured to engage the engagement mechanism when the hybrid vehicle travels reversely by drive power of the second motor or drive power of the first motor and the second motor. The electronic control unit is configured to cause disengagement of the engagement mechanism when the hybrid vehicle travels forward by the drive power of the second motor or the drive power of the first motor and the second motor.

According to the above aspect, the second motor operates as a drive power source for a reverse travel. In this case, since the engagement mechanism stops the rotation of the output shaft of the engine or the rotational member that is coupled thereto, the torque that is output by the first motor can serve as drive torque for the reverse travel. As a result, the two motors can operate as the drive power sources for the reverse travel, and thus the large drive power can be obtained. In addition, the engagement mechanism is disengaged and the output shaft of the engine or the rotational member that is coupled thereto can rotate in the case of a forward travel. Accordingly, it is possible to prevent or suppress torque that acts on the engagement mechanism or the rotational member whose rotation is stopped thereby from becoming excessive when so-called reverse input from a drive wheel side becomes large due to resonance or the like that is caused by abrupt braking or repeated change in traveling resistance.

In the above aspect, the electronic control unit may be configured to operate the first motor and the second motor as drive power sources for the reverse travel when the engagement mechanism is engaged in a reverse travel state.

In the above aspect, the hybrid vehicle may include a parking brake mechanism and a drive wheel or a member configured to transmit torque to the drive wheel. The parking brake mechanism may be configured to stop rotation of the drive wheel or rotation of the member in a stopped state of the vehicle. The electronic control unit may be configured to engage the engagement mechanism after a predetermined specified time period has elapsed since selection of the reverse travel state when the reverse travel state is selected in a state that the parking brake mechanism is operated and the vehicle is parked on a downhill.

According to the above aspect, a state in which the parking brake mechanism is engaged and the vehicle is parked is switched to the reverse travel state on the downhill. In this case, since the parking brake mechanism is switched to the disengaged state, a load that acts on the parking brake mechanism due to gravitational acceleration is canceled, and in conjunction with this, the vehicle moves for a distance that corresponds to backlash that exists inevitably in a power transmission mechanism. Then, the engagement mechanism is switched to the engaged state. Thus, it is possible to prevent or suppress temporary torque that is generated in conjunction with the disengagement of the parking brake mechanism from acting on the engagement mechanism or the rotational member whose rotation is stopped thereby.

In the above aspect, the electronic control unit may be configured to disengage the engagement mechanism when the electronic control unit predicts that excessive torque is generated in the engagement mechanism in the reverse travel state or the specified rotational member whose rotation is inhibited by the engagement mechanism in the reverse travel state.

According to the above aspect, when the engagement mechanism is engaged and the vehicle travels reversely, and when it is predicted that large torque acts on the engagement mechanism or the rotational member whose rotation is stopped by the engagement mechanism, the engagement mechanism is disengaged, and the rotation of the rotational member is allowed. Accordingly, when the large torque acts, the rotational member rotates and receives the torque. Thus, the excessive torque is avoided from acting on the engagement mechanism or the rotational member.

In the above aspect, the electronic control unit may be configured to, when drive power that is requested for the reverse travel is equal to or higher than predetermined reference drive power, engage the engagement mechanism and generate the drive power by the first motor and the second motor. The electronic control unit may be configured to, when the drive power that is requested for the reverse travel is lower than the predetermined reference drive power, disengage the engagement mechanism and generate the drive power by the second motor.

According to the above aspect, if it is configured that the engagement mechanism is engaged and the drive power is generated by both of the first and second motors only in the case where the high drive power is requested in the reverse travel state, such as in the case of an uphill road or in the case where the vehicle runs over a step, an opportunity that the engagement mechanism is engaged is limited. Thus, it is possible to suppress the excessive torque from acting on the engagement mechanism or the member whose rotation is stopped thereby.

A second aspect of the present invention is a hybrid vehicle. The hybrid vehicle includes: an engine; a first motor; an output member; a differential mechanism, the engine, the first motor, and the output member being coupled via the differential mechanism; a second motor configured to apply torque to the output member; an engagement mechanism configured to stop rotation of an output shaft of the engine or rotation of a specified rotational member that is coupled to the output shaft of the engine; and an electronic control unit. The electronic control unit is configured to engage the engagement mechanism when the hybrid vehicle travels reversely by drive power of the second motor or drive power of the first motor and the second motor. The electronic control unit is configured to disengage the engagement mechanism when the hybrid vehicle travels forward by the drive power of the second motor or the drive power of the first motor and the second motor.

In the above aspect, the engagement mechanism may be a selectable one-way clutch. The selectable one-way clutch may be configured to select between an engaged state and a disengaged state. The engaged state may be a state in which rotation of the engine in a rotational direction of the engine is stopped and rotation of the engine in an opposite direction from the rotational direction of the engine is allowed. The disengaged state may be a state in which the rotation of the engine in the rotational direction of the engine and the rotation of the engine in the opposite direction from the rotational direction of the engine are allowed.

According to the above aspect, the engagement mechanism is constructed from the selectable one-way clutch. Accordingly, the vehicle can travel reversely by only using the second motor in a state that the engagement mechanism remains to be engaged and that an operation state thereof is not switched during the reverse travel. In this case, if the selectable one-way clutch is switched to a disengaged state, so-called dragging of the selectable one-way clutch can be resolved. Furthermore, the selectable one-way clutch not only maintains the engaged state in a uniform manner when torque in a specified direction acts thereon but also can be switched to the disengaged state that rotation in the specified direction is allowed when the torque in the specified direction acts thereon. Thus, the selectable one-way clutch is controlled in the disengaged state as necessary, such as when the excessive torque is predicted. Therefore, degradation of durability of the selectable one-way clutch or the like can be suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 6:
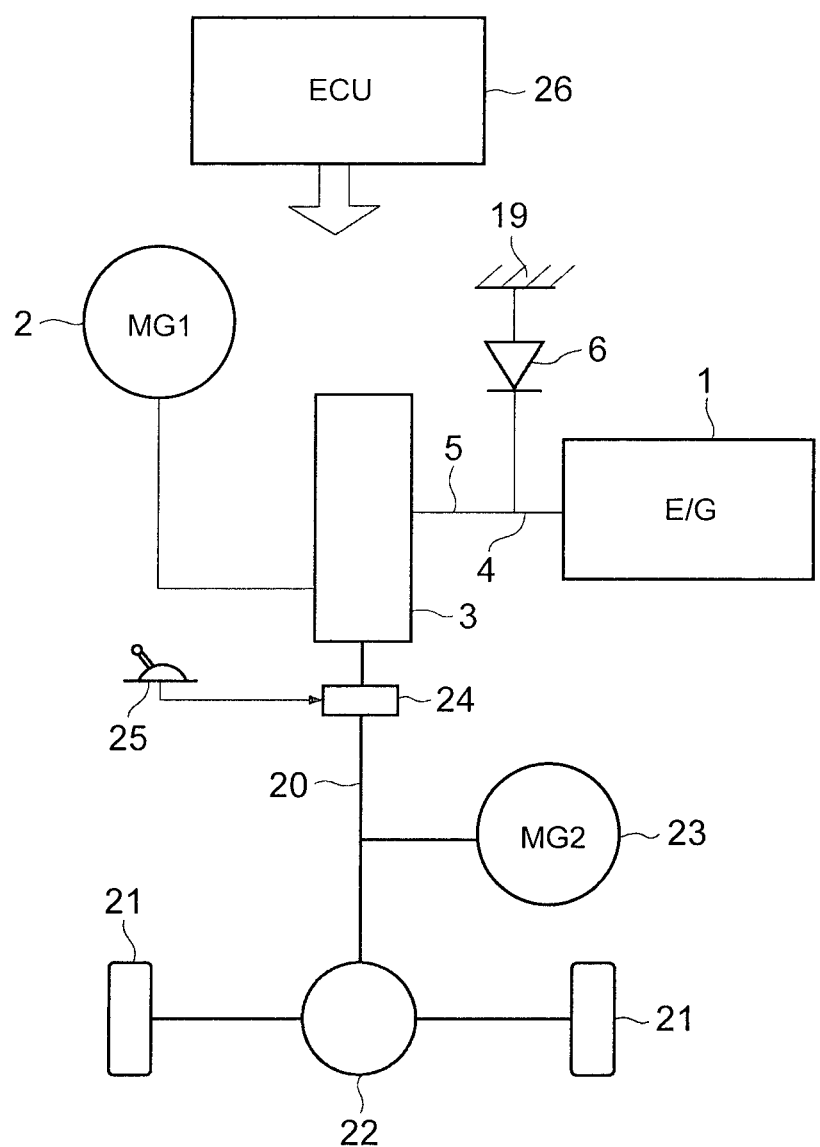
FIG. 6 is a schematic view that schematically shows an example of a power train of a hybrid vehicle for the present invention.

The present invention is a control device for a hybrid vehicle, and the hybrid vehicle includes an internal combustion engine (an engine) and a motor having a power generation function as drive power sources. The present invention particularly includes at least two motors. The hybrid vehicle is a so-called two motor type in which a first motor and the engine are coupled to a power split mechanism that includes a differential mechanism, in which power generated by the first motor that functions as a power generator is supplied to a second motor, and in which power is output from the second motor to an output member. An example of such a hybrid vehicle is schematically shown in FIG. 6.

An engine (ENG) 1 and a first motor generator (MG1) 2 are coupled to a power split mechanism 3. The first motor generator (MG1) 2 is an example of the first motor of the present invention. This power split mechanism 3 is configured to perform a differential action by using three rotational elements, for example. As an example, the power split mechanism 3 includes a planetary gear mechanism. The engine 1 is coupled to the first rotational element, such as a carrier, in the power split mechanism 3. In addition, the first motor generator 2 is coupled to the second rotational element, such as a sun gear, in the power split mechanism 3. Furthermore, the third rotational element, such as a ring gear, in the power split mechanism 3 serves as an output element. A selectable one-way clutch (hereinafter described as a SOWC) 6 is provided between this power split mechanism 3 and the engine 1. The SOWC 6 can stop forward rotation of an output shaft 4 of the engine 1 or a member that is coupled to the engine 1 (an input shaft 5 or the above carrier). Here, the forward rotation refers to rotation in a rotational direction of the output shaft 4 in a state of self-sustaining rotation of the engine 1.

Figure 7A:
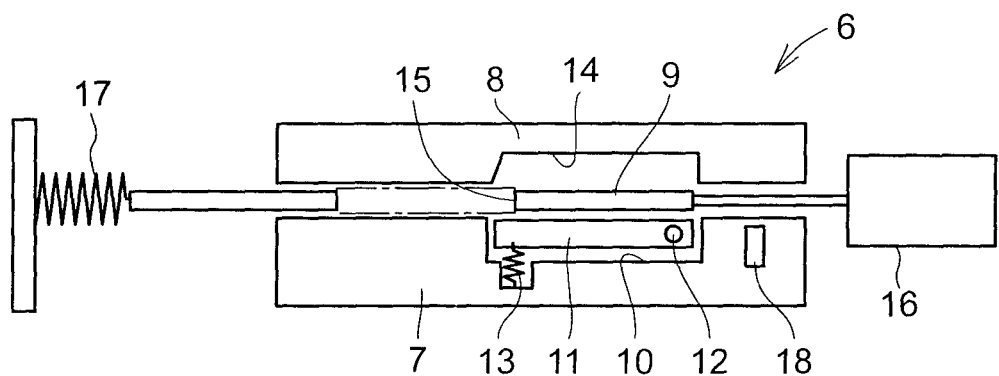
FIG. 7A and FIG. 7B are schematic views that schematically show an example of a selectable one-way clutch that can be used in the present invention.
Figure 7B:
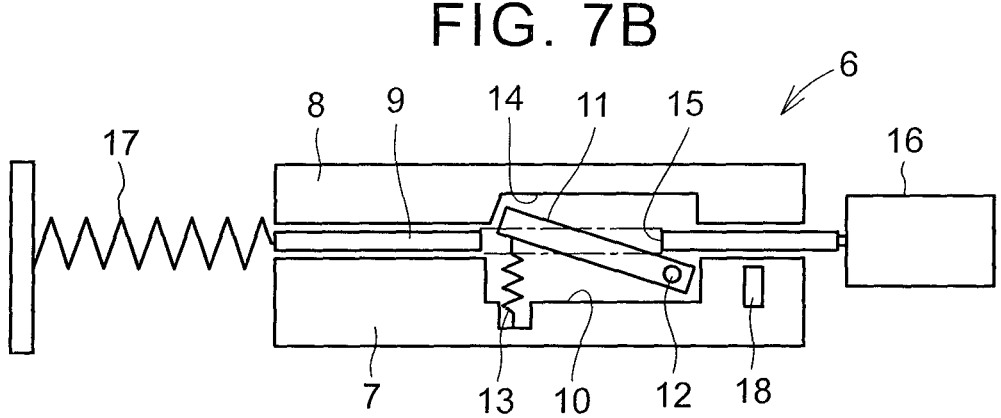

As described in US 2013/0062151 A, the SOWC 6 is a one-way clutch that can switch between an engaged state (an operation state) in which torque in a specified direction is transmitted between two members and a disengaged state (a non-operation state) in which torque is not transmitted in a forward direction or a reverse rotation. An example of the SOWC 6 is schematically shown in FIG. 7A and FIG. 7B. A pocket plate 7 and a notch plate 8 that rotate relative to each other are arranged on a same axis to face each other. A selector plate 9 is arranged between these plates 7, 8 such that the selector plate 9 can move in a horizontal direction in FIG. 7A and FIG. 7B with respect to the pocket plate 7 and the notch plate 8. A concave section (a pocket) 10 is provided in a surface of the pocket plate 7 that faces the notch plate 8. A strut 11 is housed in the pocket 10. The strut 11 is a member that is engaged with the notch plate 8 to transmit torque. The strut 11 is formed in a plate shape that is thinner than a depth of the pocket 10. One end of the strut 11 is swingably attached by a pin 12 that is provided in the pocket plate 7. In addition, another end of the strut 11 is provided with a strut spring 13 that presses the end to the notch plate 8 side.

Meanwhile, a notch 14 is provided at a position that corresponds to the pocket 10 and in a surface of the notch plate 8 that faces the pocket plate 7. The notch 14 is a concave section that is recessed in a thickness direction of the notch plate 8 and in which a tip of the strut 11 enters.

The selector plate 9 that is arranged between the pocket plate 7 and the notch plate 8 is provided with a through hole 15 that opens or closes an opening of the pocket 10. This through hole 15 is provided in the substantially same shape as an opening shape of the pocket 10. A solenoid 16 is provided as an actuator that relatively moves this selector plate 9 with respect to the pocket plate 7. In addition, a return spring 17 is provided to return the solenoid 16 to a non-operation state (an OFF state). Noted that a stroke sensor 18 detects displacement of the selector plate 9 or an operation amount of the solenoid 16, and, based on a detection result, determines the engaged state or the disengaged state of the SOWC 6.

The pocket plate 7 is coupled to a fixed section 19 such as a casing. The notch plate 8 is coupled to the output shaft 4 of the engine 1 or the input shaft 5 of the power split mechanism 3. FIG. 7A shows the disengaged state of the SOWC 6. FIG. 7B shows the engaged state of the SOWC 6. When the solenoid 16 is energized and operates from a state shown in FIG. 7B, the selector plate 9 moves in a left direction in FIG. 7A and FIG. 7B, the through hole 15 thereof is displaced with respect to the pocket 10, and the pocket 10 is thereby closed by the selector plate 9. As a result, the strut 11 is enclosed in the pocket 10, and the pocket plate 7 and the notch plate 8 are brought into the disengaged state. When the energization of the solenoid 16 is blocked from a state shown in FIG. 7A, and thus the solenoid 16 is brought into a non-operating state, the selector plate 9 moves in a right direction in FIG. 7A and FIG. 7B by the return spring 17, and the through hole 15 thereof substantially corresponds the pocket 10. As a result, the tip of the strut 11 is pushed by the strut spring 13 and projected to the notch plate 8 side. When the notch plate 8 rotates relative to the pocket plate 7 to a position where the notch 14 substantially corresponds to the pocket 10 in this state, the tip of the strut 11 enters the notch 14. Accordingly, when the torque acts in a direction that the tip of the strut 11 abuts against an inner surface of the notch 14, the tip of the strut 11 abuts against the inner surface thereof. Thus, the further relative rotation between the pocket plate 7 and the notch plate 8 is inhibited. Noted that, when a direction that the torque acts is opposite from the above-described case, a back surface (an upper surface in FIG. 7A) of the strut 11 is pushed by an opening end of the notch 14 (a left end of the notch 14 in FIG. 7A), and the strut 11 thereby collapses to the pocket plate 7 side. Thus, the relative rotation between the pocket plate 7 and the notch plate 8 becomes possible.

An output member 20, such as an output gear, is coupled to the output element in the above-described power split mechanism 3. This output member 20 is coupled to a differential 22 that transmits torque to drive wheels 21. Then, a second motor generator (MG2) 23 is coupled to a power transmission path from the output member 20 to the differential 22. The second motor generator (MG2) 23 is an example of the second motor in the present invention.

In addition, a parking brake mechanism 24 is provided that maintains a parked state of the vehicle. This parking brake mechanism 24 has the same configuration as a parking brake mechanism that has conventionally been known, and is configured to be coupled to the drive wheels 21 and stop rotation of a member that co-rotates with the drive wheels 21, for example, the output member 20. More specifically, a member whose rotation should be stopped in a parked state of the vehicle is provided with a parking gear, and it is configured that the parking gear meshes with a parking lock pole. The parking lock pole is coupled to a shift device 25. When the shift device 25 selects a parking position, the parking lock pole is configured to turn to the parking gear side and mesh with the parking gear.

The second motor generator 23 and the above-described first motor generator 2 are electrically connected to each other so as to allow supply and reception of electric power between each other via a controller unit that includes an inverter, a battery, and the like (each of them is not shown). Then, an electronic control unit (ECU) 26 is provided that executes control of output, start, and stop of the engine 1, the engagement and disengagement of the SOWC 6, the torque of each of the motor generators 2, 23, and the like. This ECU 26 is mainly constructed from a microcomputer. This ECU 26 is configured to perform computation on the basis of various types of input data, data that is stored in advance, and the like and to output a computation result as a control command signal to the engine 1, the SOWC 6, the controller for each of the motor generators 2, 23, or the like. Examples of the data (a detection signal) that is input in this ECU 26 include a vehicle speed, a state of charge (SOC) of a battery, a shift position selected by the shift device 25, an accelerator pedal operation amount, a brake signal, a road surface friction coefficient (a road surface μ), and a gradient of a road surface or distinction between an uphill road and a downhill road.

In the above-described hybrid vehicle, it is possible to select between a hybrid travel mode (an HV mode) in which the engine 1 and the second motor generator 23 are used as the drive power sources and a motor travel mode (an EV mode) in which the vehicle travels by driving at least the second motor generator 23 with the electric power of the battery. The EV mode can be selected in a case of the forward travel and in a case of the reverse travel. During the reverse travel, a single motor mode in which only the second motor generator 23 is used as the drive power source or a twin motor mode in which the first and second motor generators 2, 23 are used as the drive power sources can be set. During the forward travel in the EV mode, the vehicle can travel not only by the second motor generator 23 but also by using both of the first and second motor generators 2, 23 as the drive power sources. In this case, as described in JP 2013-141959 A, which is described above, for example, when the one-way clutch that prevents or inhibits the negative rotation of the engine 1 is additional provided, the vehicle can also travel by using both of the first and second motor generators 2, 23 during the forward travel. Alternatively, it may be configured that the SOWC 6 is provided with a function to prevent or inhibit the negative rotation of the engine 1.

Figure 8A:
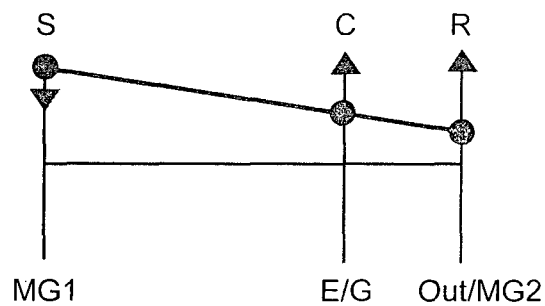
FIG. 8A and FIG. 8B are collinear diagrams on a planetary gear mechanism that constitutes a power split mechanism.

An operation state in the HV mode will be described. FIG. 8A is a collinear diagram of the planetary gear mechanism that constitutes the above-described power split mechanism 3. In an example shown here, the first motor generator 2 is coupled to a sun gear S, the engine 1 is coupled to a carrier C, a ring gear R serves as the output element, and the torque of the second motor generator 23 is applied to the output member 20 that is coupled to the output element. Since the vehicle travels forward in the HV mode, the SOWC 6 is controlled in the disengaged state, the engine 1 rotates forward, and thereby torque in a forward rotational direction acts on the carrier C. In this state, the first motor generator 2 functions as a power generator, and generates torque in a negative rotational direction (a reverse rotational direction). As a result, the ring gear R generates the drive power in the forward rotational direction on the basis of the torque of the first motor generator 2. Meanwhile, the electric power that is generated by the first motor generator 2 is supplied to the second motor generator 23, the second motor generator 23 functions as the motor, and the torque thereof is transmitted to the output member 20. In other words, some of the power of the engine 1 that is split by the power split mechanism 3 is transmitted from the power split mechanism 3 to the output member 20. The rest of the power of the engine 1 is converted to the electric power by the first motor generator 2, then reconverted to mechanical power by the second motor generator 23, and transmitted to the output member 20.

Figure 8B:
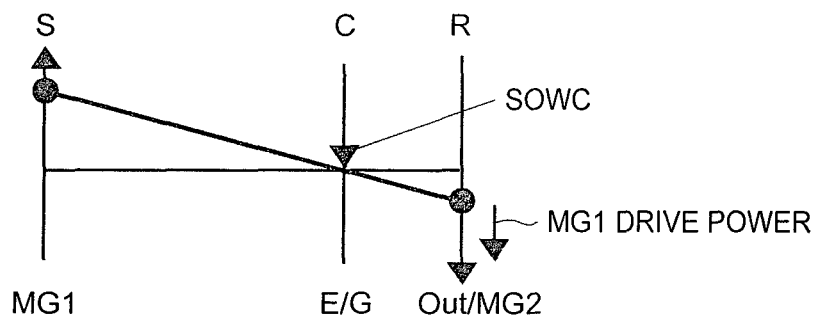

In the EV mode, the electric power is supplied from the battery to the second motor generator 23, and the second motor generator 23 functions as the motor. When the vehicle travels forward, the second motor generator 23 rotates forward. When the vehicle travels reversely, the second motor generator 23 rotates reversely. Each of these cases corresponds to the so-called single motor mode. In a case of the reverse travel, the twin motor mode is set in which, in addition to the second motor generator 23, the first motor generator 2 is used as the drive power source. In this case, the SOWC 6 is engaged such that the reactive force that is generated by driving of the first motor generator 2 is received by the carrier C. Such a state is shown in FIG. 8B. More specifically, when the SOWC 6 is brought into the engaged state, the rotation of the output shaft 4 of the engine 1 or the member that is coupled to the engine 1 in the forward direction is inhibited. Accordingly, when the first motor generator 2 rotates in the forward rotational direction, the torque thereof is transmitted to the ring gear R and appears as the torque in the reverse rotational direction. Thus, the torque in a reverse travel direction that is generated by each of the first motor generator 2 and the second motor generator 23 is transmitted to the output member 20, and the hybrid vehicle can travel reversely by large torque that is generated by these two motor generators 2, 23.

Figure 1:
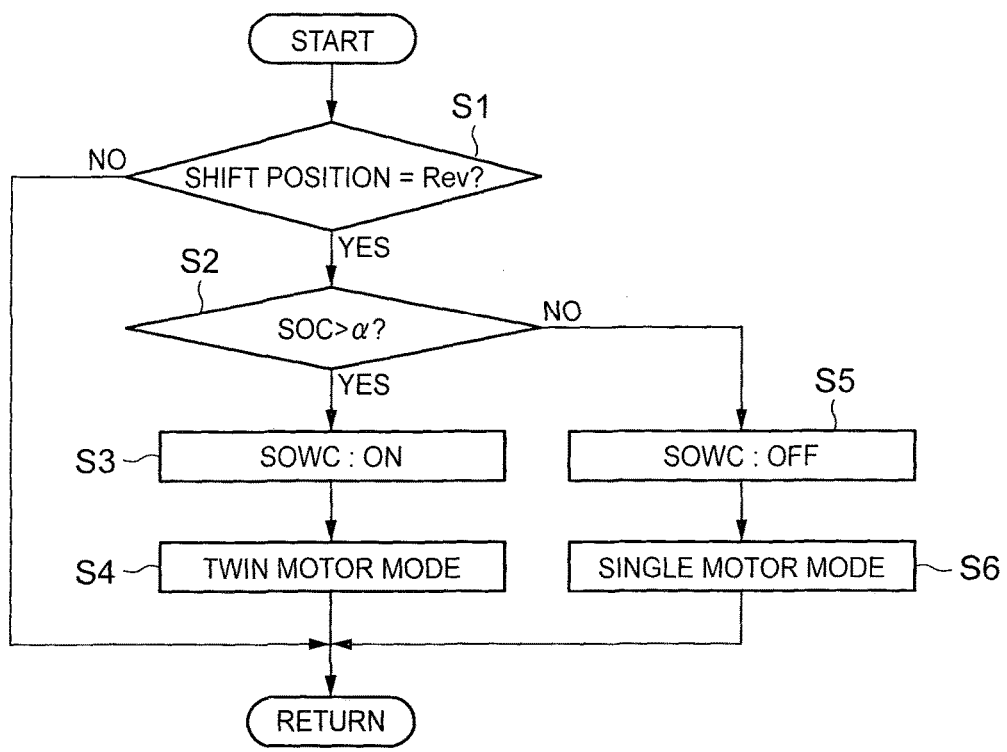
FIG. 1 is a flowchart for illustrating an example of control that is executed by a control device according to the present invention.

The above-described SOWC 6 functions to inhibit the rotation of the output shaft 4 of the engine 1, the input shaft 5 that is coupled thereto, or the above-described carrier C in the forward direction. Accordingly, there is a possibility that excessive torque is applied at least temporarily to any of these members due to a change in the travel state of the hybrid vehicle. In view of this, the control device according to the present invention controls the SOWC 6 in accordance with the travel state of the hybrid vehicle, which will be described below, and also selects a travel mode. FIG. 1 is a flowchart for illustrating an example of such control, and the control is repeatedly executed at specified short time intervals when the hybrid vehicle travels in the EV mode. First, it is determined whether a reverse travel state (Rev) was selected or whether the reverse travel state has been selected (step S1). This determination can be made on the basis of a shift position signal that is input from the shift device 25. Accordingly, in the "case where the vehicle travels reversely" in the present invention, the vehicle may be stopped (is stationary) or travel. In other words, the shift position only needs to be a reverse position. If the reverse travel state has been selected and thus the determination in step S1 is positive, it is determined whether the state of charge (SOC) of the battery exceeds a specified reference state α (step S2). This reference state α corresponds to a lower limit value of the state of charge that is predetermined to maintain durability of the battery and the like. Noted that, if the determination in step S1 is negative, the process returns. In this case, the travel mode that corresponds to the vehicle speed, the accelerator pedal operation amount, or the like at the time is selected, for example.

If the determination on this step S2 is positive, the SOWC 6 is engaged (ON) (step S3). More specifically, the control to operate the SOWC 6 into the state shown in FIG. 7B, that is, the control to stop the forward rotation of the output shaft 4 of the engine 1 or the carrier C in the power split mechanism 3 by the SOWC 6 is executed. In this state, the torque in the forward rotational direction of the first motor generator 2 can act as the torque in the reverse rotational direction of the ring gear R. Thus, the twin motor mode in which the first and second motor generators 2, 23 are operated as the motors is set as the travel mode during the reverse travel (step S4). Control that is executed in this step S4 is control in which a flag is turned ON to start control for the twin motor mode, control to start subroutine for the twin motor mode, or the like. Then, the process returns.

Meanwhile, if the state of charge (SOC) of the battery is equal to or lower than the specified reference state α and thus the determination in step S2 is negative, the SOWC 6 is controlled in the disengaged (OFF) state (step S5). More specifically, control to operate the SOWC 6 in the state shown in FIG. 7A is executed. That is, the control is executed such that the output shaft 4 of the engine 1 or the carrier C in the power split mechanism 3 can rotate in the forward or reverse direction. In this case, the single motor mode in which only the second motor generator 23 functions as the motor in the EV travel mode and the vehicle travels by the power thereof is set (step S6). Control that is executed in this step S6 is control by which a flat is turned ON to start control for the single motor mode, control to start subroutine for the single motor mode, or the like. Then, the process returns.

As described above, by the control device according to the present invention, the SOWC 6, which is an engagement mechanism that inhibits the forward rotation of the output shaft 4 of the engine 1, the input shaft 5 coupled thereto, or the carrier C, is only engaged during the reverse travel. Accordingly, the twin motor mode can be set in which both of the first motor generator 2 and the second motor generator 23 operate as the motors, and thus the large drive power can be obtained during the reverse travel. Meanwhile, in the case of the EV travel mode in which the vehicle travels forward only by using the second motor generator 23 as the drive power source, the SOWC 6 that is the example of the engagement mechanism of the present invention is disengaged. Accordingly, even when the power split mechanism 3 receives the large torque from the drive wheel 21 side, the carrier C, the input shaft 5, or the output shaft 4 of the engine 1 can rotate. Thus, during the forward travel in which the large torque is likely to be generated, the excessive torque can be prevented or inhibited from acting on any of these members or the SOWC 6 in advance.

Figure 2:
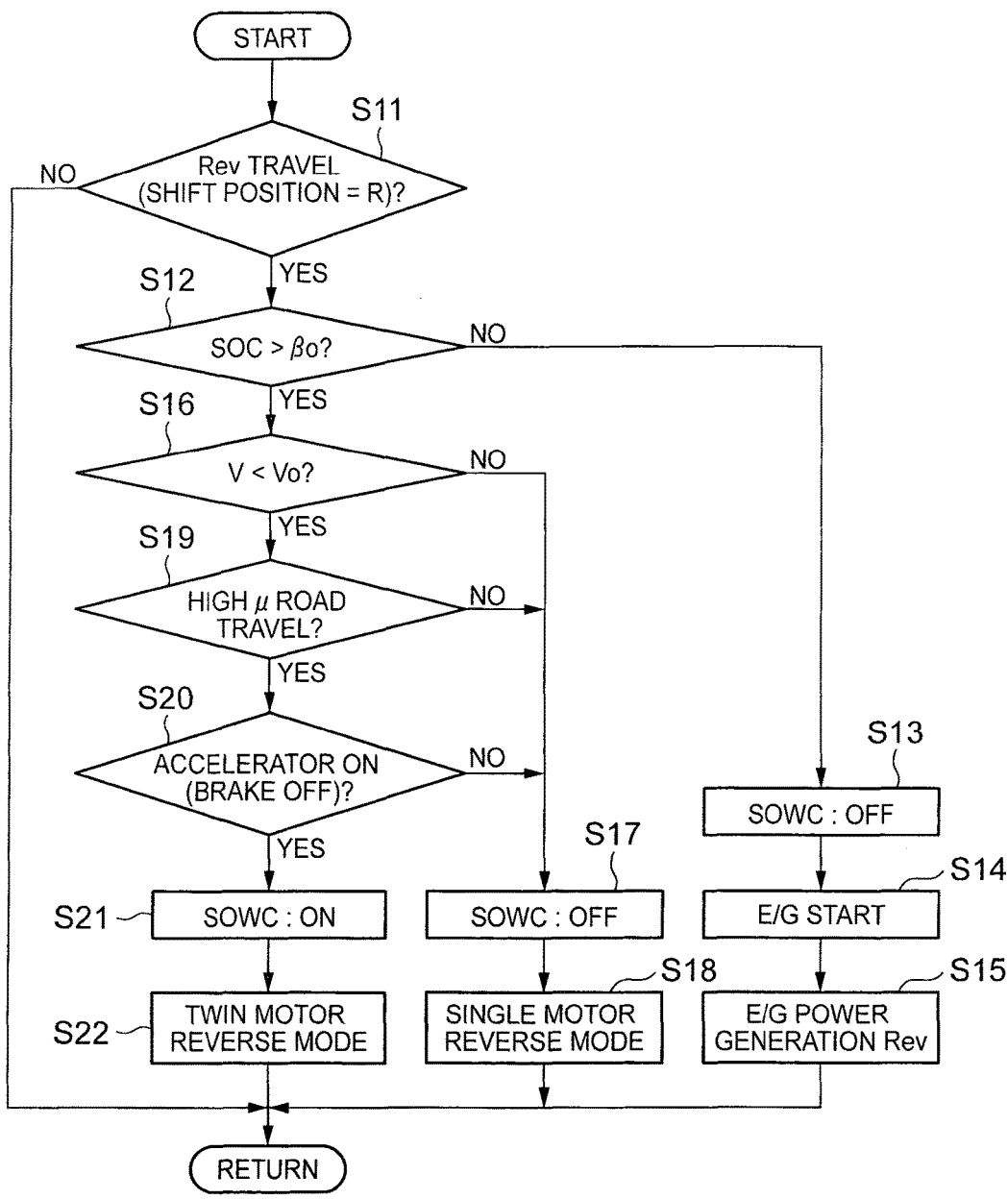
FIG. 2 is a flowchart for illustrating another example of the control that is executed by the control device according to the present invention.

When the hybrid vehicle travels reversely, the control device according to the present invention basically engages the SOWC 6 and selects the twin motor mode. However, the control device according to the present invention can be configured to control the SOWC 6 into the disengaged state when a specified condition is not satisfied. FIG. 2 is a flowchart for illustrating an example of such control. A routine shown in this chart is repeatedly executed at short time intervals in a case where a control system is ON, that is, a power switch of the hybrid vehicle is ON or the like.

First, it is determined whether the vehicle travels reversely (Rev) or whether the shift position is in reverse (R) even in a state that the vehicle speed is zero (step S11). The routine shown in this FIG. 2 is used to select a drive mode during the reverse travel. Thus, if the reverse travel state is not set or selected and thus the determination in step S11 is negative, no particular control is executed, and the process returns. On the contrary, if the determination in step S11 is positive, it is determined whether the state of charge exceeds a specified value β (step S12). This specified value β is a design value that is defined as an allowable lower limit value of the state of charge of the battery. Accordingly, when the state of charge is equal to or lower than this specified value β, such a situation can be considered that each of the motor generators 2, 23 does not generate an expected amount of torque or that the state of charge is abruptly lowered due to the travel in the twin motor mode and the durability of the battery is thereby degraded.

In view of the above, if the determination in step S12 is negative, that is, if the state of charge is equal to or lower than the specified value β, the above-described SOWC 6 is controlled in the disengaged state (OFF) (step S13). In other words, the forward rotation of the output shaft 4 of the engine 1, the input shaft 5 that is coupled thereto, or the like is allowed. Then, the engine 1 that has been stopped is started (step S14). This start control can be conventionally known control. For example, the control may be executed by operating the first motor generator 2 as the motor and thereby causing motoring (start) of the engine 1 by the torque of the first motor generator 2. When a starter is provided, the starter may be used to cause motoring (start) of the engine 1.

Then, after the start of the engine 1 is completed, the engine 1 is used to drive the first motor generator 2 as the power generator, and the electric power is generated by the first motor generator 2. The electric power is used to operate the second motor generator 23 as the motor and causes the reverse (Rev) travel (step S15). Then, the process returns.

Meanwhile, if the determination in step S12 is positive, that is, if the state of charge exceeds the specified value β, it is determined whether a vehicle speed V is lower than a reference vehicle speed $V_0$ (step S16). If the vehicle travels on a wavelike road in a state that the SOWC 6 is controlled in the engaged state, there is a possibility that the large torque is input from the drive wheel 21 and acts on the SOWC 6. The wavelike road is a road surface on which concavity and convexity are repeatedly formed. When the hybrid vehicle HV travels on the wavelike road, travel resistance that is applied from the road surface to the drive wheel 21 is repeatedly changed, and a frequency of such a change corresponds to a pitch of the road surface. On the contrary, a power transmission system of a hybrid vehicle HV from the engine 1 to the first motor generator 2 constitutes a vibration system and has a specified resonance frequency. Thus, when the hybrid vehicle HV travels on the wavelike road at a specified vehicle speed, resonance may occur in the power transmission system. Such a vehicle speed is a vehicle speed in a resonance vehicle speed range. When such resonance occurs, the large torque that results from the vibration may act on the SOWC 6 by the output shaft 4 of the engine 1, the input shaft 5 that is coupled thereto, or the like. In above-described step S16, it is determined whether the vehicle travels at a vehicle speed that causes such a situation. The reference vehicle speed $V_0$ is preferably the lowest vehicle speed within the resonance vehicle speed range, and is 30 km/h when the resonance vehicle speed range is 30 to 40 km/h, for example.

If the determination in step S16 is negative, there is a high possibility that the vehicle speed V has fallen within a resonance vehicle speed range or falls within the resonance vehicle speed range. Accordingly, in order to avoid the large torque from acting on the input shaft 5, the output shaft 4, the SOWC 6, or the like, the SOWC 6 is controlled in the disengaged (OFF) state (step S17). Thus, step S16 is one of control steps to determine the establishment of a condition that the large torque acts on the output shaft 4 of the engine 1, the input shaft 5 that is coupled thereto, the SOWC 6, or the like. If the SOWC 6 is disengaged, only the second motor generator 23 is operated as the drive power source, and the vehicle travels reversely by using the drive power (step S18). In other words, a single motor reverse mode is set.

If the vehicle speed V is a vehicle speed that is lower than the reference vehicle speed $V_0$ and thus the determination in step S16 is positive, it is determined whether the road surface on which the vehicle travels is a high μ road whose frictional coefficient (μ) is high (step S19). The determination on whether it is the high μ road can be made by various methods that have conventionally been known. For example, the road surface can be determined as the high μ road, when the road surface friction coefficient is estimated by using deceleration (deceleration G) of a vehicle body and a tire slip ratio that is obtained on the basis of a vehicle body speed and a wheel speed, and the road surface friction coefficient is equal to or higher than a predetermined specified value. In addition, when snowy road information is obtained by a navigation system, the road surface can be determined as a low μ road (not as the high μ road). Accordingly, step S19 may be a determination step in which it is determined whether the estimated road surface friction coefficient is at least equal to the predetermined specified value or in which it is determined whether the road surface information such as the snowy road information by the navigation system is present. If the determination in this step S19 is negative, that is, if it is determined that the road surface on which the vehicle travels is not the high μ road, the process proceeds to step S17 to step S18. In other words, the SOWC 6 is disengaged, and the single motor reverse mode is set. If the road surface friction coefficient is lower than an estimated value, it can be considered that a driver abruptly depresses a brake pedal (not shown). The abrupt depression of the brake pedal leads to the same state as a state that the drive wheel 21 abruptly receives negative torque, and thus the large reverse torque acts on the power split mechanism 3. If the rotation of the carrier C, the input shaft 5 that is integrated therewith, the output shaft 4 of the engine 1, or the like is stopped in this state, the excessive torque acts on any of these members, for example, the SOWC 6. In order to eliminate such a situation in advance, if the determination in step S19 is negative, the SOWC 6 is brought into the disengaged state. Accordingly, step S19 is one of the control steps to determine the establishment of a condition that the excessive torque acts on the output shaft 4 of the engine 1, the input shaft 5 that is coupled thereto, or the like.

If the determination in step S19 is positive, it is determined whether the accelerator is ON (step S20). In turn, in this step S20, it is determined whether the driver will perform a braking operation. If the driver performs the braking operation, it may result in abrupt braking depending on a way to operate or an amount of the operation, and may further lead to the same situation as so-called braking in the low μ road, which is described above. As a result, the large torque may act on the carrier C, the input shaft 5 that is coupled thereto, or the like. Accordingly, if the determination in step S20 is negative, the process proceeds to step S17 to step S18 as in the case where the determination in step S19 is negative. In other words, the SOWC 6 is disengaged, and the single motor reverse mode is set. Thus, step S20 is one of the control steps to determine the establishment of the condition that the excessive torque acts on the output shaft 4 of the engine 1, the input shaft 5 that is coupled thereto; or the like. Noted that, in step S20, instead of the determination on whether the accelerator is ON, it may be determined whether the brake pedal is OFF.

If the determination in step S20 is positive, there is a low possibility that the excessive torque acts on the output shaft 4 of the engine 1, the input shaft 5 that is coupled thereto, the carrier C, or the like, that durability of any of these is degraded, or the like even when the SOWC 6 is engaged and the forward rotation of any of these shafts 4, 5 or the like is stopped during the reverse travel. Accordingly, the SOWC 6 is engaged (ON) (step S21). Next, the first and second motor generators 2, 23 function as the traveling motors, and the reverse travel state (a twin motor reverse mode) in which these motor generators are used as the drive power sources is set (step S22). Control in this step S22 is control in which the flat is turned ON to start control for the twin motor reverse mode, control to start the subroutine for the twin motor reverse mode, or the like. Then, the process returns.

Here, a description will further be made on the vehicle speed that is a condition to prohibit the engagement of the SOWC 6 in the reverse travel state and set the single motor mode. If it is determined in step S16 that the vehicle speed V is equal to or higher than the reference vehicle speed $V_0$, the SOWC 6 is disengaged. This means that the SOWC 6 is only engaged in the reverse travel state in which the vehicle speed is lower than the reference vehicle speed $V_0$, and that the SOWC 6 is controlled in the disengaged state in a case other than the above, that is, when the vehicle travels reversely at the reference vehicle speed $V_0$ or higher or when the vehicle travels forward. The control that is just as described will be described as control in regard to the vehicle speed. That is, when the SOWC 6 is engaged during the reverse travel, a maximum vehicle speed is restricted to be lower than the reference vehicle speed $V_0$. In the EV travel mode other than the above, the maximum vehicle speed is set to be a higher vehicle speed than the reference vehicle speed $V_0$.

When the control device according to the present invention is configured to execute the control that is illustrated in FIG. 2, the large drive power can be obtained by using the two motor generators 2, 23 as the drive power sources during the reverse travel under the specified condition. In addition, in the case where occurrence of a predetermined state can be predicted in which the excessive torque acts on the member whose forward rotation is stopped by the SOWC 6 in the so-called twin motor mode (when the determination in each of step S16, S19, S20 is negative), the SOWC 6 is disengaged, and the forward rotation of the above member is allowed. Accordingly, it is possible to prevent the excessive torque from acting on these members in advance, and it is thus possible to prevent or suppress degradation of durability thereof or the like.

The control device according to the present invention can be configured such that the SOWC 6 is engaged only when the large drive power is requested during the reverse travel. An example of such control is illustrated in the flowchart in FIG. 3. This type of control can be executed in combination with the control examples shown in FIG. 1 and FIG. 2, which is described above. Alternatively, this type of control can be executed independently and separately from these control examples. A routine that will be described herein is repeatedly executed at specified short time intervals when the control system is ON, such as when the power switch of the hybrid vehicle is ON. First, it is determined whether the vehicle travels reversely (Rev) or whether the shift position is in reverse (R) (step S31). This is the same determination step as step S11 that is shown in FIG. 2 described above. If the determination in this step S31 is negative, no particular control is executed, and this routine is terminated. On the other hand, if the reverse travel state is selected and thus the determination in step S31 is positive, it is determined whether requested drive power Fr is larger than predetermined reference drive power $F_0$ (step S32). This reference drive power $F_0$ is drive power that is equal to or slightly smaller than an upper limit value of the drive power that can be output by the second motor generator 23, and can be appropriately determined in design. Examples in which the requested drive power Fr becomes larger than the reference drive power $F_0$ includes a case where the vehicle travels reversely on the uphill road and a case where the vehicle runs over a step on the road surface. Accordingly, the determination in step S32 can be made on the basis of the accelerator pedal operation amount, a throttle opening degree, a detected value by an acceleration sensor, a current value of the second motor generator 23, a relation between a torque command value and the acceleration, or the like.

If the determination in this step S32 is positive, the SOWC 6 is engaged (ON) (step S33). In addition, the first and second motor generators 2, 23 function as the motors, and the reverse travel state (the twin motor reverse mode) in which these motor generators are used as the drive power sources is set (step S34). Control in this step S34 is the control in which the flag is turned ON to start the control for the twin motor reverse mode, the control to start the subroutine for the twin motor reverse mode, or the like. Then, the process returns. These types of the control are the same as those of the above-described control in step S21 and step S22 that are illustrated in FIG. 2. Meanwhile, if the determination in step S32 is negative, the SOWC 6 is controlled in the disengaged (OFF) state (step S35). In addition, the single motor reverse mode in which only the second motor generator 23 is operated as the drive power source is set (step S36). Control in this step S36 is the control in which the flag is turned ON to start the control for the single motor reverse travel, the control to start the subroutine for the single motor reverse travel, or the like. These types of the control are the same as those of the above-described control in step S17 and step S18 that are illustrated in FIG. 2.

Figure 3:
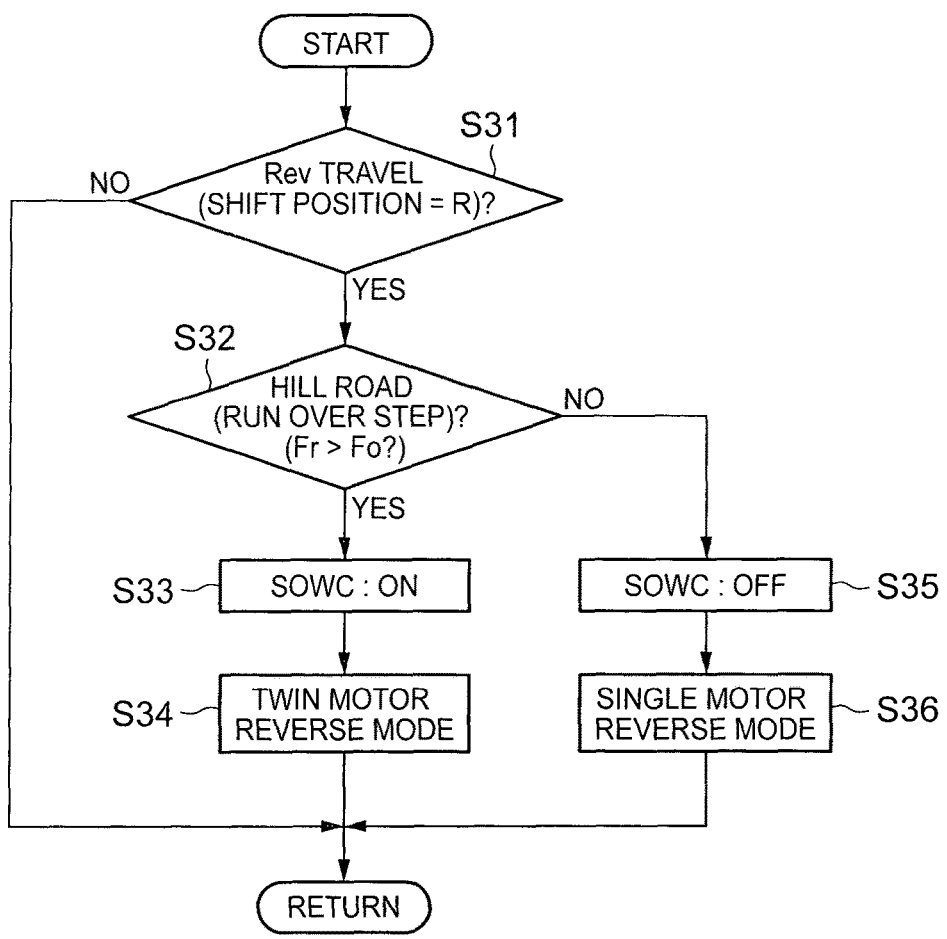
FIG. 3 is a flowchart for illustrating yet another example of the control that is executed by the control device according to the present invention.

Accordingly, in the case where it is configured to execute the control that is illustrated in FIG. 3, the SOWC 6 is engaged and the twin motor mode is set only when the large drive power is requested during the reverse travel. Accordingly, there is less opportunity that the forward rotation of the output shaft 4 of the engine 1, the input shaft 5 of the power split mechanism 3, the carrier C, or the like is inhibited. When the amount of torque is abruptly changed due to the abrupt braking or the like, there is a high possibility that the SOWC 6 is disengaged. Thus, it is possible to avoid or suppress the excessive torque from acting on the SOWC 6 or the member whose forward rotation is stopped thereby in advance.

By the way, the above-described SOWC 6 is a one-way clutch of so-called meshing type. A frictional force that corresponds to the amount of torque is generated in a meshed portion thereof, that is, a contact portion between the tip of the strut 11 and the notch 14. The torque that is just as described is torque in the forward rotational direction that is generated by the first motor generator 2. Accordingly, when it is estimated or determined that a large load acts on the SOWC 6, and when the SOWC 6 is switched from the engaged state to the disengaged state, it is preferred to lower the torque that acts on the SOWC 6 in order to smoothly or immediately disengage the SOWC 6.

Figure 4:
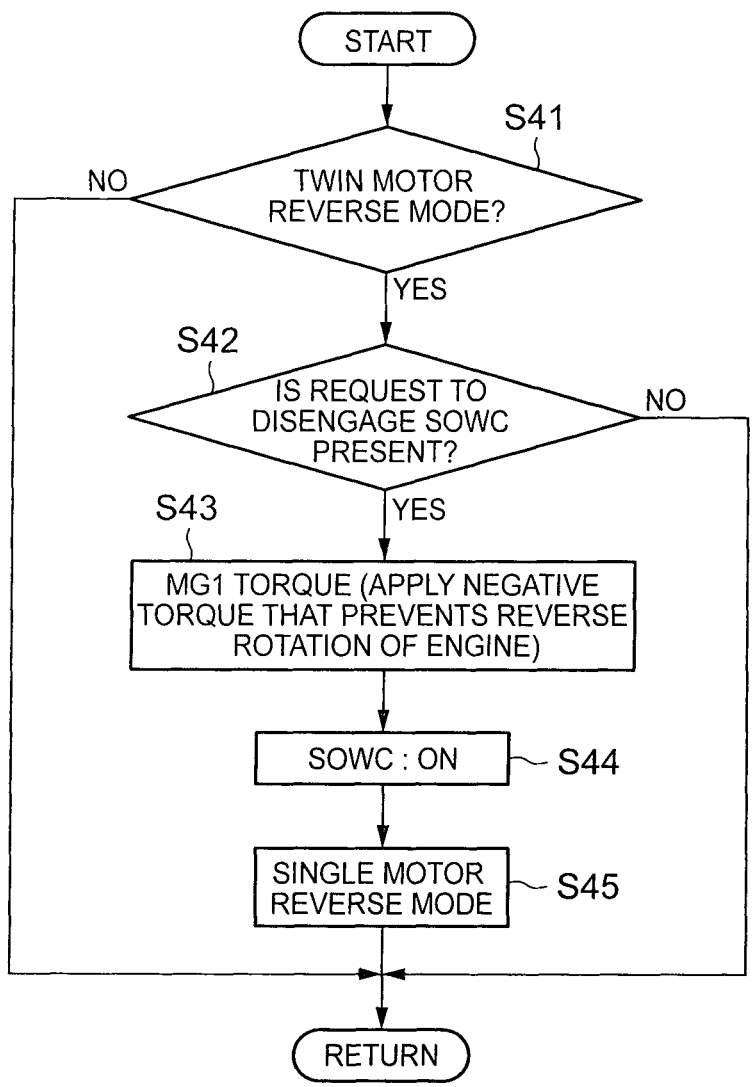
FIG. 4 is a flowchart for illustrating an example of torque control of a first motor generator when a SOWC is switched to a disengaged state.

An example of such control is illustrated as a flowchart in FIG. 4. This type of control can be executed in combination with the above-described control examples that are shown in FIG. 1 to FIG. 3. Alternatively, this type of control can independently be executed separately from those control examples, or can be executed by replacing the control that is shown in FIG. 2 or FIG. 3 therewith. A routine illustrated herein is repeatedly executed at specified short time intervals when the control system is ON, such as when the power switch of the hybrid vehicle is ON. First it is determined whether the reverse travel state in which the two motor generators 2, 23 function as the motors, that is, the twin motor reverse mode has been set (step S41). This can be determined on the basis of the content of the control command signal for the above-described controller or the content of the control command signal for the motor generators 2, 23 from the controller unit. If the determination in this step S41 is negative, no particular control is executed, and the process returns. On the contrary, if the determination in step S41 is positive, it is determined whether a request to disengage the SOWC 6 is present (step S42). As described above, in the control device according to the present invention, the SOWC 6 is disengaged when there is a possibility that the excessive torque acts on the SOWC 6 in the state that the SOWC 6 is engaged and the vehicle travels reversely. Accordingly, in step S42, the determination may be made on whether such a possibility is present. Alternatively, the determination may be made on whether the state of charge is reduced.

If the determination in step S42 is negative, no particular control is executed, and the process returns. On the contrary, if the determination in step S42 is positive, the torque of the first motor generator 2 that generates the torque in the forward rotational direction for the reverse travel is reduced (step S43). The reduction of torque not only includes the reduction of torque for the reverse travel but also includes the increase of torque in the reverse rotational direction. When the torque in the reverse rotational direction is generated, the torque is limited to torque that prevents the reverse rotation of the engine 1. With such control, the torque that acts on the SOWC 6 is reduced, and the above-described frictional force between the strut 11 and the inner surface of the notch 14 is reduced. Thus, when the above-described selector plate 9 moves in the left direction in FIG. 7B, the strut 11 is smoothly removed from the notch 14, and the SOWC 6 can thereby be switched to the disengaged state. Accordingly, following step S43, control to switch the SOWC 6 to the disengaged (OFF) state (step S44) is executed, and the single motor reverse mode in which only the second motor generator 23 is used as the drive power source for the reverse travel is set (step S45). Control in this step S45 is the control in which the flag is turned ON to start the control for the single motor reverse mode, the control to start the subroutine for the single motor reverse mode, or the like.

If it is configured to execute the control that is illustrated in FIG. 4 as described above, the SOWC 6 can smoothly or immediately be switched from the engaged state to the disengaged state. Thus, a situation where the excessive torque acts on the SOWC 6 or the member whose forward rotation is inhibited thereby due to the delayed disengagement or a situation where a shock occurs can be avoided or suppressed. Such operation and effect can be obtained by appropriately switching the engaged state and the disengaged state of the SOWC 6.

Figure 5:
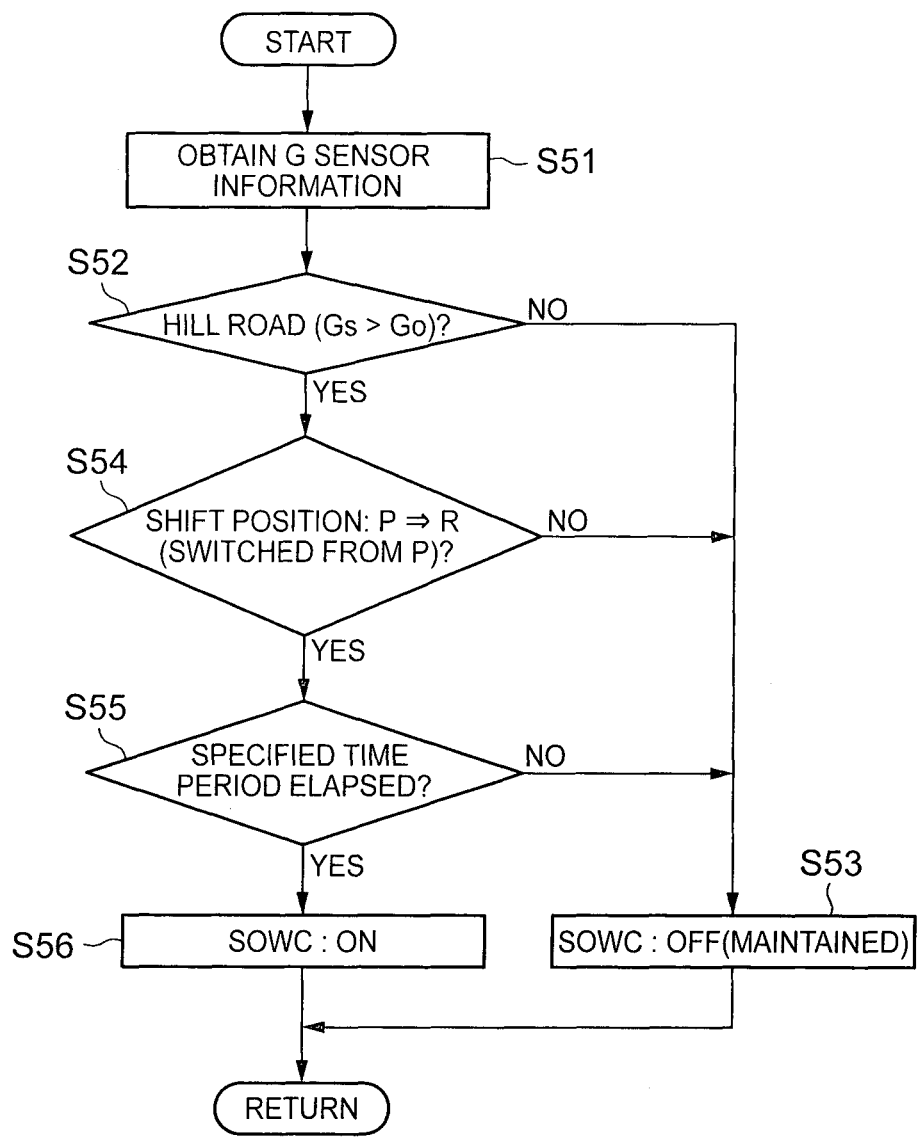
FIG. 5 is a flowchart for illustrating an example of control when a shift position is switched from a parked position to a reverse position in a state that a vehicle is parked on a hill road.

Meanwhile, when the SOWC 6 is engaged, engagement control that corresponds to a status of the hybrid vehicle is preferably executed. An example of such engagement control will be described. FIG. 5 is a flowchart of an example of a case where the SOWC 6 is engaged in a state that the vehicle is parked on the uphill or downhill road. This type of control can be executed in combination with the above-described control examples that are illustrated in FIG. 1 to FIG. 4. Alternatively, this type of control can be executed separately from those control examples, or can be executed by replacing the control that is shown in FIG. 2 or FIG. 4 therewith. In a control example that is illustrated in FIG. 5, information from the acceleration sensor (a G sensor) is obtained in a state that the hybrid vehicle is stopped (step S51). In a state that the hybrid vehicle is parked on a hill road, forward/reverse acceleration that corresponds to an inclination angle is generated, and this is contained in the information of the acceleration sensor. Thus, it is possible to make a determination on the hill road on the basis of the information of the acceleration sensor. Noted that the determination on the hill road may be made on the basis of a relationship between a braking force immediately before the hybrid vehicle is stopped and the forward/reverse acceleration or the like.

Next, it is determined whether the hill road is a downhill road on the basis of a value Gs of the G sensor (step S52). For example, it is determined whether the value Gs of the G sensor is larger than a predetermined reference value $G_0$. If the hybrid vehicle is parked on the downhill, the acceleration Gs that corresponds to a downward gradient is detected due to gravitational acceleration. On the contrary, if the hybrid vehicle is parked on the uphill, the acceleration Gs that corresponds to an upward gradient is detected. Noted that, when a semiconductor G sensor that detects the acceleration from a change in a relative distance between a fixed electrode and a movable electrode is used, the acceleration that corresponds to the downward gradient during parking corresponds to the deceleration during traveling on a flat road. In addition, the acceleration that corresponds to the upward gradient during parking corresponds to the acceleration during traveling on the flat road. The value to determine whether the acceleration is higher or lower than the deceleration on the flat road is set in advance with the reference value $G_0$ being used. Accordingly, when the value Gs of the G sensor exceeds the reference value, it can be determined that the road surface on which the vehicle is parked is the downhill. Noted that, in step S52, a downward inclination angle may be calculated on the basis of the value Gs of the G sensor by using a conventionally known method, and it may be determined whether the downward inclination angle is larger than a predetermined specified value. If the determination in step S52 is negative, the road surface on which the vehicle is parked is the flat road, the uphill, or the downhill with a small gradient. In this case, the disengaged state of the SOWC 6 is maintained (step S53). Then, the process returns.

On the contrary, if the road surface on which the vehicle is parked is the downhill road, the value Gs of the G sensor is larger than the reference value $G_0$, and the determination in step S52 is thereby positive, it is determined whether the shift position is switched from parking (P) to reverse (R) (step S54). This determination can be made on the basis of the above-described shift position signal from the shift device 25. If the determination in this step S54 is negative, there is no particular necessity to stop the forward rotation of the output shaft 4 of the engine 1, the input shaft 5 of the power split mechanism 3, or the like. Thus, the process proceeds to step S53, the disengaged state of the SOWC 6 is maintained, and the process returns. On the contrary, if the shift position is switched from the parking position to the reverse position, and the determination in step S54 is thereby positive, it is determined whether a specified time period has elapsed since the time at which the shift position is switched (step S55). This control is executed to relax the action of the torque on the SOWC 6 that is generated when the vehicle moves in the forward travel direction for a distance that corresponds to backlash (a gap) that exists inevitably in the power transmission system in conjunction with switching of the parking brake mechanism 24 to the disengaged state, and then the backlash is canceled to cause the vehicle to stop. Accordingly, this specified time period can be defined in advance in consideration of time required for any of the rotational members to rotate by the torque, time required for vibration caused by the torque to be settled to a certain degree, or the like.

If the determination in this step S55 is positive, the SOWC 6 is engaged (step S56), and the process returns. It is because the above-described backlash is canceled at the time at which the specified time period has elapsed and a brake of the wheel or a shift mechanism receives a load to stop the vehicle. Thus, even when the SOWC 6 is engaged in this state, a large load does not act on the SOWC 6. On the contrary, if the determination in step S55 is negative, the process proceeds to step S53, the disengaged state of the SOWC 6 is maintained, and the process returns. Accordingly, it is possible to prevent the excessive torque caused by the movement for the distance that corresponds to the backlash from acting on the SOWC 6. Such operation and effect can be obtained by appropriately switching the engaged state and the disengaged state of the SOWC 6.

In the above-described example, the state in which the excessive torque acts on the SOWC 6 or the member whose forward rotation is stopped thereby and that has been raised includes the state that the vehicle speed V during the reverse travel exceeds the reference vehicle speed $V_0$, the state that the road on which the vehicle travels is the so-called low μ road having the small road surface friction coefficient μ, the state that the accelerator pedal is not depressed and thus the accelerator is OFF, or the state that the brake pedal is depressed and thus the brake is ON. The present invention is not limited to the example. As the state in which the excessive torque acts on the SOWC 6 or the member whose forward rotation is stopped thereby, various states may be set as necessary. In addition, the engagement mechanism in the present invention is not limited to the above-described SOWC 6, but may be a so-called two way clutch that is selectively engaged in the forward rotational direction or the reverse rotational direction or a friction clutch or a meshing clutch that transmits the torque in both of the forward direction and the reverse direction. Furthermore, the engagement mechanism in the present invention may be a brake that is constructed from any of these engagement mechanisms to stop the rotation.

The invention claimed is:
1. A control device for a hybrid vehicle, the hybrid vehicle including
an engine,
a first motor,
an output member, a differential mechanism, the engine, the first motor, and the output member being coupled via the differential mechanism, a second motor configured to apply torque to the output member, and an engagement mechanism configured to stop rotation of an output shaft of the engine or rotation of a specified rotational member that is coupled to the output shaft of the engine, an electronic control unit configured to:

(i) engage the engagement mechanism and generate drive power by the first motor and the second motor, when in response to the hybrid vehicle travels travelling reversely in reverse by drive power of the second motor or drive power of the first motor and the second motor and drive power that is requested for a reverse travel is equal to or higher than a predetermined reference drive power, and (ii) disengage the engagement mechanism and generate drive power by the second motor, when in response to the hybrid vehicle travels travelling forward by the drive power of the second motor or the drive power of the first motor and the second motor and the drive power that is requested for the reverse travel is lower than the predetermined reference drive power.

2. The control device according to claim 1, wherein the electronic control unit is configured to operate the first motor and the second motor as drive power source for the reverse travel when the engagement mechanism is engaged in a reverse travel state.

3. The control device according to claim 1, wherein the hybrid vehicle includes a parking brake mechanism and a drive wheel or a member configured to transmit torque to the drive wheel, the parking brake mechanism is configured to stop rotation of the drive wheel or rotation of the member in a stopped state of the hybrid vehicle, and the electronic control unit is configured to engage the engagement mechanism after a predetermined specified time period has elapsed since selection of the reverse travel state when the reverse travel state is selected in a state that the parking brake mechanism is operated and the hybrid vehicle is parked on a downhill.

4. The control device according to claim 1, wherein the electronic control unit is configured to disengage the engagement mechanism when the electronic control unit predicts that excessive torque is generated in the engagement mechanism in the reverse travel state or the specified rotational member whose rotation is inhibited by the engagement mechanism in the reverse travel state.

5. A hybrid vehicle comprising:
a first motor;
an output member;
a differential mechanism, the engine, the first motor, and the output member being coupled via the differential mechanism;
a second motor configured to apply torque to the output member;

an engagement mechanism configured to stop rotation of an output shaft of the engine or a specified rotational member that is coupled to the output shaft of the engine; and an electronic control unit configured to (i) engage the engagement mechanism and generate drive power by the first motor and the second motor, when in response to the hybrid vehicle travels reversely travelling in reverse by drive power of the second motor or drive power of the first motor and the second motor and drive power that is requested for a reverse travel is equal to or higher than a predetermined reference drive power, and (ii) disengage the engagement mechanism and generate drive power by the second motor, when in response to the hybrid vehicle travels travelling forward by the drive power of the second motor or the drive power of the first motor and the second motor and the drive power that is requested for the reverse travel is lower than the predetermined reference drive power.

6. The hybrid vehicle according to claim 5, wherein the electronic control unit is configured to operate the first motor and the second motor as drive power sources for the reverse travel when the engagement mechanism is engaged in a reverse travel state.

7. The hybrid vehicle according to claim 5, wherein the engagement mechanism is a selectable one-way clutch, the selectable one-way clutch is configured to select between an engaged state and a disengaged state, the engaged state is a state in which rotation of the engine in a rotational direction of the engine is stopped and rotation of the engine in an opposite direction from the rotational direction of the engine is allowed, and the disengaged state is a state in which the rotation of the engine in the rotational direction of the engine and the rotation of the engine in the opposite direction from the rotational direction of the engine are allowed.

8. The hybrid vehicle according to claim 5, wherein the hybrid vehicle includes a parking brake mechanism and a drive wheel or a member configured to transmit torque to the drive wheel, the parking brake mechanism is configured to stop rotation of the drive wheel in a stopped state of the hybrid vehicle or rotation of the member in the stopped state of the hybrid vehicle, and the electronic control unit is configured to engage the engagement mechanism after a predetermined specified time period has elapsed since selection of a reverse travel state when the reverse travel state is selected in a state that the parking brake mechanism is operated and the hybrid vehicle is parked on a downhill.

9. The hybrid vehicle according to claim 4, wherein the electronic control unit is configured to disengage the engagement mechanism when the electronic control unit predicts that excessive torque is generated in the engagement mechanism in a reverse travel state or the specified rotational member whose rotation is inhibited by the engagement mechanism in the reverse travel state.

* * * * *